United States Patent
Hu et al.

(10) Patent No.: US 7,873,070 B2
(45) Date of Patent: Jan. 18, 2011

(54) DETERMINING A NUMBER OF AUTOMATIC REQUEST RETRANSMISSIONS BASED ON BLOCK SIZE

(75) Inventors: Teck Hu, Budd Lake, NJ (US); Yifei Yuan, Kearny, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1321 days.

(21) Appl. No.: 10/942,618

(22) Filed: Sep. 16, 2004

(65) Prior Publication Data
US 2006/0059399 A1    Mar. 16, 2006

(51) Int. Cl.
*H04J 3/16*    (2006.01)
(52) U.S. Cl. .............. 370/465; 370/311; 370/338; 455/522
(58) Field of Classification Search ........... 370/252, 370/352, 230, 329, 315, 338, 468, 473, 335, 370/342; 718/18, 48; 455/522
See application file for complete search history.

(56) References Cited

U.S. PATENT DOCUMENTS 7,155,236 B2 * 12/2006 Chen et al. .......... 455/454
2002/0019965 A1 * 2/2002 Bims et al. .......... 714/748
2002/0172192 A1 * 11/2002 Hunzinger et al. .......... 370/352
2004/0085934 A1 * 5/2004 Balachandran et al. ...... 370/335
2004/0160924 A1 * 8/2004 Narayan et al. ............ 370/335
2004/0162083 A1   8/2004 Chen et al. ............... 455/454
2004/0190540 A1 * 9/2004 Miyake et al. ............. 370/428
2004/0228313 A1 * 11/2004 Cheng et al. ............. 370/342
2004/0240424 A1 * 12/2004 Fong et al. ............... 370/349
2005/0002363 A1 * 1/2005 Cheng et al. ............. 370/338
2006/0092972 A1 * 5/2006 Petrovic et al. ........... 370/469
2007/0111747 A1 * 5/2007 Lundby et al. ............ 455/522

FOREIGN PATENT DOCUMENTS

EP          0820 167      7/1997
WO      WO 03/096150    11/2003

OTHER PUBLICATIONS

European Search Report EP 05 25 5603 dated Nov. 16, 2005.

* cited by examiner

*Primary Examiner*—Aung S Moe
*Assistant Examiner*—Vinncelas Louis
(74) *Attorney, Agent, or Firm*—Williams, Morgan & Amerson, PC

(57) ABSTRACT

The present invention provides a method of wireless telecommunication of a message having a block size. The method includes determining a number of retransmissions of the message based upon the block size.

12 Claims, 3 Drawing Sheets

DETERMINING A NUMBER OF AUTOMATIC REQUEST RETRANSMISSIONS BASED ON BLOCK SIZE

BACKGROUND OF THE INVENTION

1. Field of the Invention

This invention relates generally to telecommunication systems, and, more particularly, to wireless telecommunication systems.

2. Description of the Related Art

Release 5 of the Universal Mobile Telecommunication System (UMTS) protocol permits each mobile unit, sometimes referred to as a user equipment or UE, to autonomously transmit messages to a base station (or Node-B) on a dedicated channel (or DCH). Most transmissions from the mobile unit are scheduled by the base station, which may result in scheduling gain. However, the mobile unit can autonomously transmit messages at any time without being scheduled by the base station. The autonomous transmission may cause interference to other channels associated with other mobile units, thus increasing the rise-over-thermal at the base station, as well as other undesirable effects that may offset a portion of the scheduling gain.

The autonomous transmissions are typically limited to certain rates, at least in part to limit the potential interference and control the rise-over-thermal. For example, each mobile unit may transmit in autonomous mode at a minimum transmission rate of at least 8 kbps. By limiting the data rate of the autonomous transmissions, the transmission power required of the mobile units may also be limited. Thus, the potential interference and rise-over-thermal may be kept with a desired range. However, the mobile unit may also transmit autonomously at higher bit rates with correspondingly higher channel power, such as a transmission power, if it is determined that the potential interference and/or rise-over-thermal are not above some threshold level.

Future generations of mobile telecommunications standards may include an "enhanced" dedicated channel (EDCH). The enhanced dedicated channel may support one or more Transmission Time Intervals (TTIs), which may also be referred to as frame sizes. For example, UMTS release 6 may support both a 10 ms TTI and a 2 ms TTI, although the 2 ms TTI is not mandatory. The reduced frame sizes supported by future generations of mobile telecommunication standards may require a higher data transmission rate and, consequently, higher mobile unit transmission powers. For example, using typical assumed values for the size of a Radio Link Control (RLC) Packet Data Unit (PDU) and associated transmission overhead, the minimum data transfer rate necessary to transmit a data packet in a 2 ms TTI would be about 176 kbps. At this rate, the required channel power, or $E_c$, may be higher than what could be supported by the mobile unit without causing unacceptably high levels of interference and/or rise-over-thermal at a receiving base station.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for wireless telecommunication of a message having a block size. The method includes determining a number of retransmissions of the message based upon the block size.

BRIEF DESCRIPTION OF THE DRAWINGS

The invention may be understood by reference to the following description taken in conjunction with the accompanying drawings, in which like reference numerals identify like elements, and in which.

Figure 1:
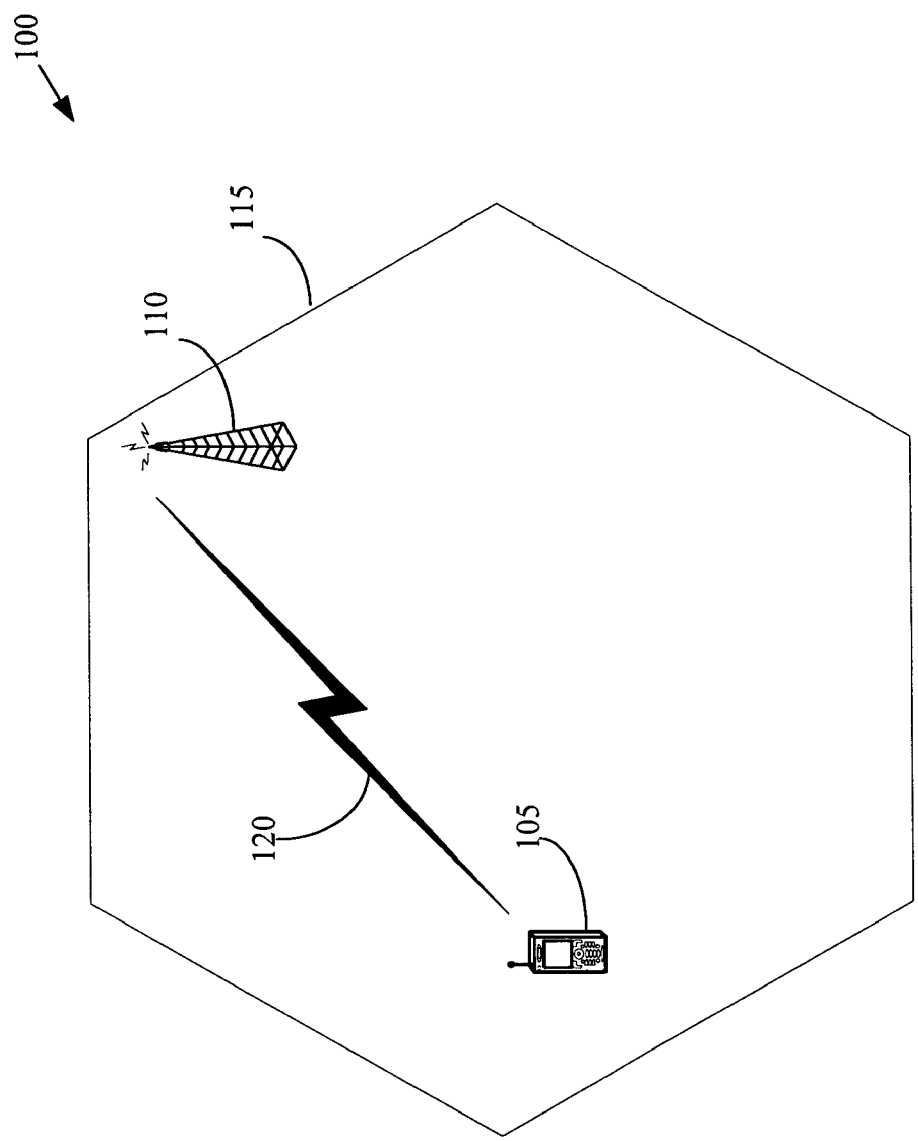
FIG. 1 conceptually illustrates one embodiment of a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one embodiment of a wireless telecommunication system 100. In the illustrated embodiment, a mobile unit 105 and a base station 110 in a cell 115 are communicatively coupled by a wireless telecommunication link 120. Although only a single mobile unit 105 and a single base station 110 are depicted in FIG. 1, persons of ordinary skill in the art should appreciate that the present invention is not limited to one mobile unit 105 and one base station 110. In alternative embodiments, additional mobile units 105 and/or base stations 110, as well as any other desirable device, may be included in the wireless telecommunication system 100. For example, the wireless telecommunication system 100 may include a radio network controller, a mobile switching center, as well as various routers, switches, hubs, and the like.

The wireless telecommunication link 120 supports one or more channels that may be used to transmit messages between the mobile unit 105 and the base station 110. The channels may be defined in any desirable manner. For example, the channels may be determined according to protocols such as Universal Mobile Telecommunication System (UMTS), Code Division Multiple Access (CDMA), Time Division Multiple Access (TDMA), Personal Communication System (PCS), Global System for Mobile telecommunications (GSM), and the like. The wireless telecommunication link 120 may also support one or more packet retransmission and/or error recovery protocols. For example, the wireless telecommunication link 120 may support an Automatic Repeat Request (ARQ) protocol, a Hybrid Automatic Repeat Request (HARQ) protocol, and the like.

Figure 2A:
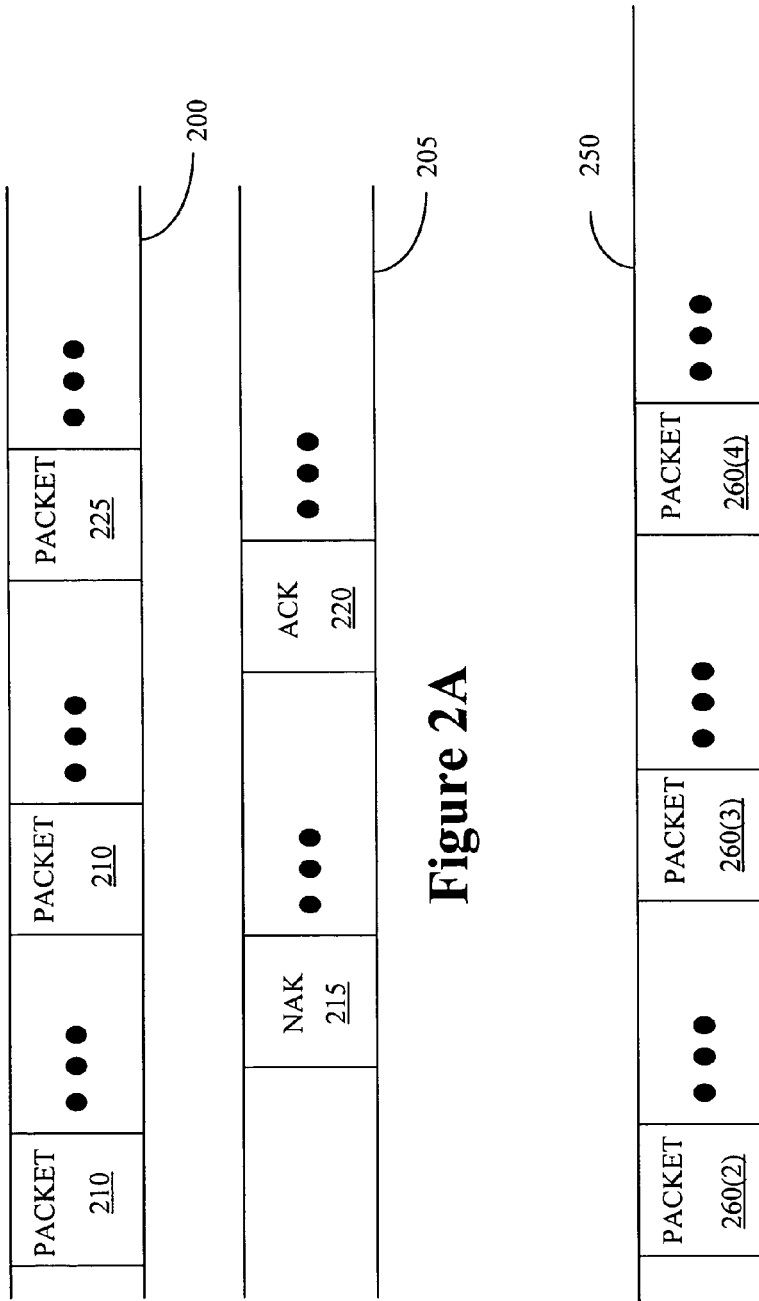
FIG. 2A conceptually illustrates a first embodiment of an uplink channel and a downlink channel, such as may be used to transmit packets in the wireless telecommunication system shown in FIG. 1, in accordance with the present invention.

FIG. 2A conceptually illustrates a first embodiment of an uplink channel 200 and a downlink channel 205, such as may be used to transmit packets between the mobile unit 105 and the base station 110 shown in FIG. 1. The uplink channel may be an enhanced dedicated channel (E-DCH), such as defined by UMTS release 6. In the illustrated embodiment, a first packet 210 is transmitted on the uplink channel 200, but the receiving device is unable to detect and/or decode the first packet 210, so a negative acknowledgement (NAK) 215 is transmitted on the downlink channel 205. Upon receive of the NAK 215, the first packet 210 is retransmitted on the uplink channel 205. The retransmitted first packet 210 is successfully detected and decoded, and so an acknowledgement (ACK) 220 is transmitted on the downlink channel 205. A second packet 225 may be transmitted on the uplink channel 205 in response to receiving the ACK 220.

In one embodiment, the signals received in the transmitted and retransmitted first packets 210 are stored in the receiving device and combined to improve the likelihood of the successful decoding of the first packet 210. The number of retransmissions may also be limited. For example, the first packet 210 may be retransmitted at most one time. If the first packet 210 is not successfully received after one retransmission, the first packet may be dropped.

Referring back to FIG. 1, transmissions on the wireless telecommunication link 120 are typically scheduled by the base station 110. However, the mobile unit 105 may also transmit messages that are not scheduled by the base station 110. Unscheduled transmissions from the mobile unit 105 will be referred to hereinafter as "autonomous" transmissions, in accordance with common usage in the art. In one embodiment, the mobile unit 105 may autonomously transmit messages having a block size that is approximately equal to a minimum block size for a particular Transport Format Combination (TFC), as defined by the relevant standard(s). The messages sent via autonomous transmissions may contain information that is used to maintain the wireless telecommunication link 120 while the mobile unit 105 is in an idle state.

In one embodiment of the present invention, a number of message retransmissions is determined based upon the block size of the message. In one embodiment, messages having a block size about equal to a minimum transport block size may be retransmitted for a first number of times and messages having a block size greater than the minimum transport block size may be retransmitted for a second number of times, where the second number is smaller than the first number. For example, an autonomous transmission having a block size about equal to the minimum block size may be retransmitted up to three times by the mobile unit 105, whereas another transmission having a block size that is greater than the minimum block size may only be retransmitted once by the mobile unit 105.

However, the present invention is not limited to providing a larger number of retransmissions to messages having a single block size. In one alternative embodiment, a threshold block size may be determined such that messages having a block size less than or about equal to the threshold transport block size may be retransmitted for a first number of times and messages having a block size greater than the threshold transport block size may be retransmitted for a second number of times, where the second number is smaller than the first number. The additional retransmissions of messages having a block size less than or about equal to the threshold transport block size may increase delay times associated with these messages. Thus, in one embodiment, the threshold size may be determined such that the threshold transport block size corresponds approximately to an expected minimum size of blocks that contain delay-sensitive information, such as voice packets.

A power for the transmitted and/or retransmitted messages may also be determined based on the number of retransmissions and the block size. In one embodiment, the transmission power of the messages having a block size about equal to a minimum transport block size (or equal to or below a threshold block size) may be lower than the power used to transmit messages having a block size above the minimum transport block size (or the threshold block size). For example, a message having a block size above the minimum transport block size (or the threshold block size) may be transmitted with the power of one Watt, which should be sufficient to allow the message to be decoded after one transmission. In contrast, messages having a block size about equal to a minimum transport block size (or equal to or below a threshold block size) may be transmitted with the power of approximately 0.25 Watts during each try, which should allow these messages to be decoded after one transmission followed by three retransmissions. Persons of ordinary skill in the art should also appreciate that known effects, such as time diversity gain achieved by message retransmissions, may also permit somewhat lower channel (or transmission) power so that messages can be decoded successfully after one transmission and three retransmissions.

The number of retransmissions and/or the transmission power may be determined at any desirable location. In one embodiment, the number of retransmissions and/or the transmission power is determined at a central location such as a radio network controller (not shown). Information indicative of the number of retransmissions and/or the channel power is then transmitted to the mobile unit 105 and/or the base station 110. For example, information indicative of the number of retransmissions and/or the transmission power may be sent to the base station 110 via a wired network and then the base stations may send information indicative of the number of retransmissions and/or the transmission power to the mobile unit 105 via the wireless telecommunication link 120.

Figure 2B:
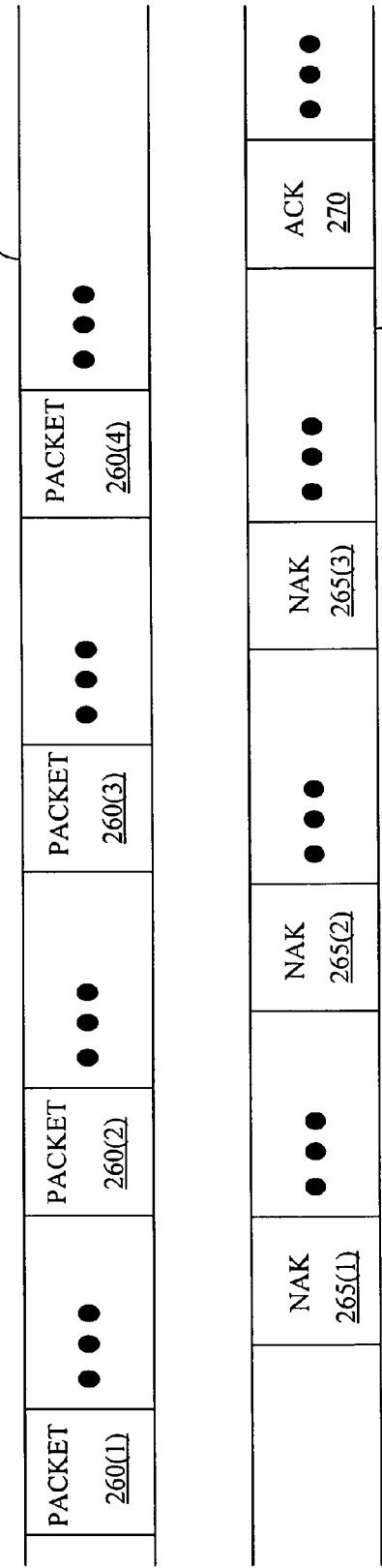
FIG. 2B conceptually illustrates a second embodiment of an uplink channel and a downlink channel, such as may be used to transmit packets in the wireless telecommunication system shown in FIG. 1, in accordance with the present invention.

FIG. 2B conceptually illustrates a second embodiment of an uplink channel 250 and a downlink channel 255, such as may be used to transmit packets between the mobile unit 105 and the base station 110 shown in FIG. 1. The uplink channel may be an enhanced dedicated channel (E-DCH), such as defined by UMTS release 6. In the illustrated embodiment, a packet 260(1) is transmitted on the uplink channel 250, but the receiving device is unable to detect and/or decode the packet 260(1), so a negative acknowledgement (NAK) 265(1) is transmitted on the downlink channel 255. For example, the packet 260(1) may be transmitted at a reduced power that may make it difficult for the packet 260(1) to be decoded. The information provided by the signal associated with the transmitted packet 260(1) is stored.

Upon receipt of the NAK 265(1), the packet 260(2) is retransmitted on the uplink channel 255. In one embodiment, the stored information provided by the signal associated with the transmitted packet 260(1) is combined with information provided by the signal associated with the retransmitted packet 260(2). However, the receiving device is unable to detect and/or decode the packet 260(1-2), so a NAK 265(2) is transmitted on the downlink channel 255. The information provided by the signal associated with the retransmitted packet 260(2) is stored.

Upon receipt of the NAK 265(2), the packet 260(3) is retransmitted on the uplink channel 255. In one embodiment, the stored information provided by the signal associated with the transmitted packet 260(1) is combined with information provided by the signal associated with the retransmitted packets 260(2-3). However, the receiving device is unable to detect and/or decode the packet 260(1-3), so a NAK 265(3) is transmitted on the downlink channel 255. The information provided by the signal associated with the retransmitted packet 260(3) is stored.

Upon receipt of the NAK 265(3), the packet 260(4) is retransmitted on the uplink channel 255. In one embodiment, the stored information provided by the signal associated with the transmitted packet 260(1) is combined with information provided by the signal associated with the retransmitted packets 260(2-4). The receiving device is able to detect and decode the packet 260(1-4), so an ACK 270 is transmitted on the downlink channel 255. For example, the accumulated channel energy associated with the transmitted and retransmitted packets 260(1-4) may be sufficient to allow the packets 260 (1-4) to be detected and decoded.

Figure 3:
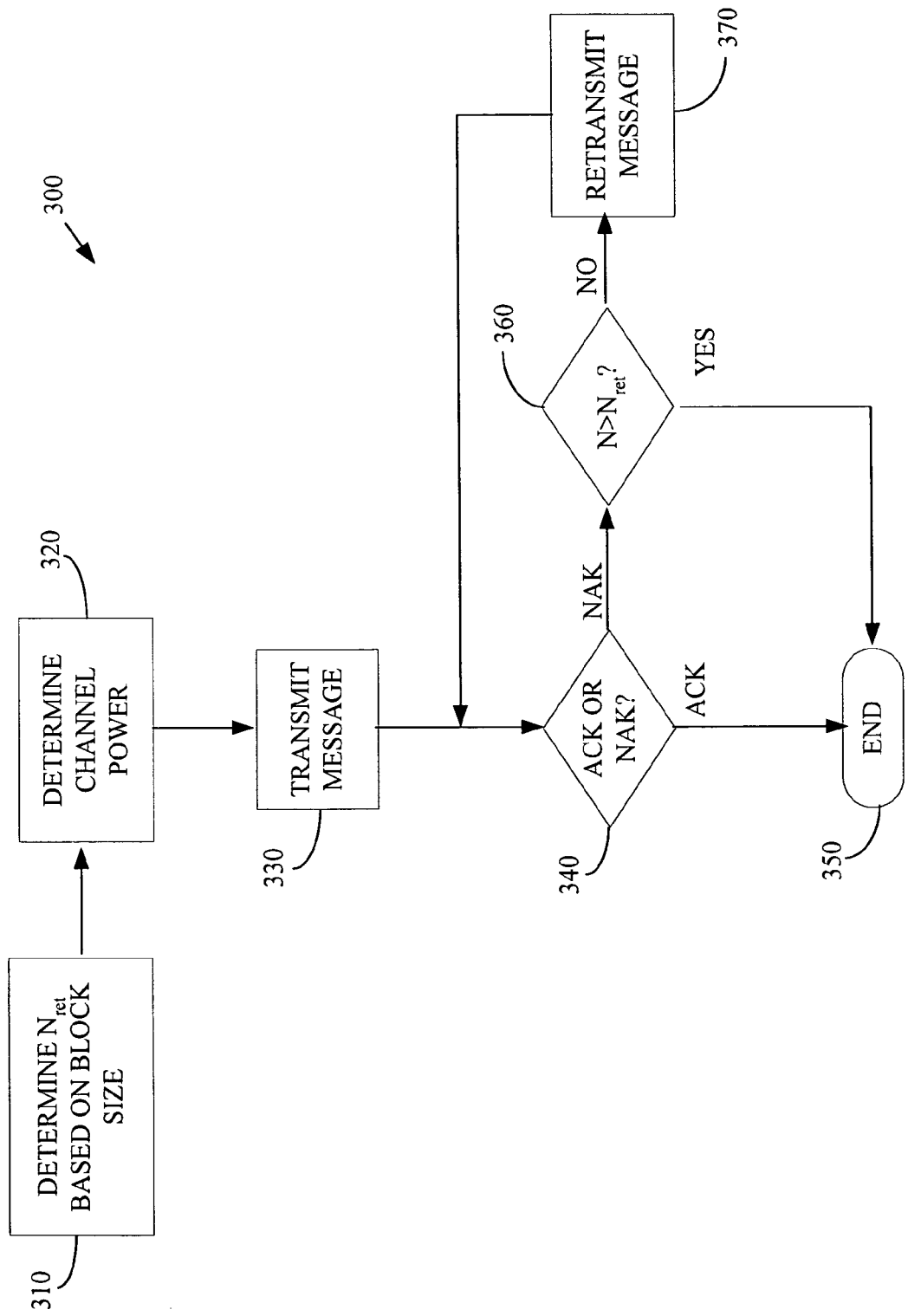
FIG. 3 conceptually illustrates a method 300 of transmitting and/or retransmitting messages based on block size, in accordance with the present invention.

FIG. 3 conceptually illustrates a method 300 of transmitting and/or retransmitting messages based on block size. In the illustrated embodiment, the number of retransmissions ($N_{ret}$) is determined (at 310) based on a block size of a message, as discussed in detail above. A power associated with transmission of the message may also be determined (at 320). The message is then transmitted (at 330) at the determined transmission power. If an acknowledgement (ACK) is received (at 340), the method 300 ends (at 350).

If a negative acknowledgement (NAK) is received (at 340), then the number of previous retransmissions is compared (at 360) to the number of retransmissions ($N_{ret}$). If the number of previous retransmissions is less than the number of retransmissions ($N_{ret}$), then the message is retransmitted (at 370). If the number of previous retransmissions is greater than or equal to the number of retransmissions ($N_{ret}$), the method ends (at 350).

By implementing one or more embodiments of the present invention, as described above, the effective data transport rate for messages having a block size about equal to a minimum transport block size (or equal to or below a threshold block size) may be reduced. For example, using typical assumed values for the size of a Radio Link Control (RLC) Packet Data Unit (PDU) and associated transmission overhead, the effective data transfer rate to transmit a data packet in a 2 ms Transmission Time Interval (TTI) would be reduced to about 44 kbps when one transmission and three retransmissions are used. For another example, using typical assumed values for the size of the RLC PDU and associated transmission overhead, the effective data transfer rate to transmit a data packet in a 2 ms TTI would be reduced to about 11 kbps when one transmission and five retransmissions are used.

Furthermore, increasing the number of retransmissions of having a block size about equal to a minimum transport block size (or equal to or below a threshold block size) may reduce the power requirements for sending these messages. Thus, the interference and rise-over-thermal contributions of the smaller block size TFCs in the TFC set may be reduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication of an autonomous message in a packet having a block size, the packet including the autonomous message being transmitted from a mobile unit to a base station without having been scheduled by the base station, the method comprising:
    determining an allowable number of retransmissions of the packet including the autonomous message based upon the block size; storing information indicating the allowable number in at least one of the mobile unit or the base station;
    wherein determining the allowable number of retransmissions comprises determining a first number of retransmissions for the packets, when the block size less than or equal to a threshold block size; and
    wherein determining the allowable number of retransmissions further comprises determining a second number of retransmissions for the packets, when the block size greater than the threshold block size, the second number of retransmissions being smaller than the first number of retransmissions.

2. The method of claim 1, further comprising determining the threshold block size.

3. The method of claim 2, wherein determining the threshold block size further comprises determining a minimum transport block size.

4. The method of claim 2, wherein determining the threshold block size further comprises determining the threshold block size based on a block size associated with delay-intolerant data blocks.

5. The method of claim 1, comprising:
    determining a transmission power based on the allowable number of retransmissions; and
    transmitting the packet including the autonomous message at about the determined transmission power.

6. The method of claim 5, comprising:
    retransmitting the packet including the autonomous message a number of times that is less than or equal to the determined allowable number of retransmissions at about the determined transmission power, each retransmission occurring in response to receiving a negative acknowledgement of a previous transmission of the packet including the autonomous message; and
    ending retransmission attempts after retransmitting the packet including the autonomous message the number of times that is equal to the determined allowable number of retransmissions.

7. The method of claim 6, wherein retransmitting the packet including the autonomous message comprises retransmitting the packet including the autonomous message according to an Automatic Repeat Request (ARQ) protocol.

8. A method of transmitting autonomous messages in a packet having a block size, the packet including the autonomous message being transmitted from a mobile unit to a base station without having been scheduled by the base station, the method comprising:
    determining an allowable number of retransmissions of the packet including the autonomous message based upon the block size;
    storing information indicating the allowable number in at least one of the mobile unit or the base station;
    transmitting the packet including the autonomous message from the mobile unit;
    retransmitting the packet including the autonomous message from the mobile unit a number of times that is less than or equal to the determined number of retransmissions, each retransmission occurring in response to receiving a negative acknowledgement of a previous transmission of the packet including the autonomous message;
    ending retransmission attempts after retransmitting the packet including the autonomous message the number of times that is equal to the determined allowable number of retransmissions.
    wherein determining the allowable number of retransmissions comprises determining a first number of retransmissions for the packets, when the block size less than or equal to a threshold block size; and
    wherein determining the allowable number of retransmissions comprises determining a second number of retransmissions for the packets, when the block size greater than the threshold block size.

9. The method of claim 8, comprising determining the threshold block size.

10. The method of claim 9, wherein determining the threshold block size comprises determining the threshold block size for delay-intolerant data blocks.

11. The method of claim 8, comprising:
    determining a transmission power based on the allowable number of retransmissions;
    transmitting the packet including the autonomous message at about the determined transmission power;
    retransmitting the packet including the autonomous message a number of times that is less than or equal to the determined number of retransmissions at about the determined transmission power, each retransmission occurring in response to receiving a negative acknowledgement of a previous transmission of the packet including the autonomous message.

12. The method of claim 8, wherein retransmitting the packet including the autonomous message comprises retransmitting the packet including the autonomous message according to a Automatic Repeat Request protocol.

* * * * *